United States Patent
Nozais et al.

(10) Patent No.: US 12,157,197 B2
(45) Date of Patent: Dec. 3, 2024

(54) METHOD AND DEVICE FOR CONTROLLING A WORKPIECE DURING ITS MANUFACTURING

(71) Applicant: I-MC, Aix-en-Provence (FR)

(72) Inventors: Dominique Nozais, Pertuis (FR); Zilong Shao, Aix-en-Provence (FR); Jean-Yves Hascoet, Nantes (FR)

(73) Assignee: I-MC, Aix-en-Provence (FR)

( * ) Notice: Subject to any disclaimer, the term of this patent is extended or adjusted under 35 U.S.C. 154(b) by 449 days.

(21) Appl. No.: 17/608,475

(22) PCT Filed: May 4, 2020

(86) PCT No.: PCT/EP2020/062330
§ 371 (c)(1),
(2) Date: Nov. 2, 2021

(87) PCT Pub. No.: WO2020/225218
PCT Pub. Date: Nov. 12, 2020

(65) Prior Publication Data
US 2022/0212306 A1    Jul. 7, 2022

(30) Foreign Application Priority Data
May 3, 2019 (FR) ...................... 1904696

(51) Int. Cl.
*B23Q 17/24* (2006.01)
*B23Q 11/08* (2006.01)
*B23Q 17/20* (2006.01)

(52) U.S. Cl.
CPC ...... *B23Q 17/2471* (2013.01); *B23Q 11/0891* (2013.01); *B23Q 17/20* (2013.01); *B23Q 2717/006* (2013.01)

(58) Field of Classification Search
CPC ............ B23Q 17/2471; B23Q 11/0891; B23Q 17/20; B23Q 2717/006; Y02P 90/02
See application file for complete search history.

(56) References Cited

U.S. PATENT DOCUMENTS 4,506,765 A * 3/1985 Payne ................. H03K 17/941
                                                   318/467
9,962,799 B2    5/2018 Hascoet et al.
(Continued)

FOREIGN PATENT DOCUMENTS

DE    102016123597 A1    6/2017
EP         2732912 A1    5/2014
(Continued)

*Primary Examiner* — Santosh R Poudel
(74) *Attorney, Agent, or Firm* — H&I PARTNERS; Chai Im; C. Andrew Im

(57) ABSTRACT

A system to control a workpiece during its manufacturing in a machining system. The control being performed in the same manufacturing phase following machining operation. The workpiece being set in the work volume of the machining system. The check operation includes the acquisition of points on the surface of the part. The robot is moved by a cart so the robot can reach the protected working area. The measuring device is positioned relative to the workpiece by the robot. Acquisition of a plurality of points on the surface of the workpiece is performed. The position of the plurality points acquired is compared with the three-dimensional model stored in the memory of the computer.

5 Claims, 6 Drawing Sheets

(56) References Cited

U.S. PATENT DOCUMENTS

| | | | | |
|---|---|---|---|---|
| 10,875,237 | B2* | 12/2020 | Rocher | B29C 64/209 |
| 2006/0215902 | A1* | 9/2006 | Shibuya | G01N 21/95607 |
| | | | | 382/149 |
| 2011/0150509 | A1* | 6/2011 | Komiya | G03G 15/326 |
| | | | | 399/51 |
| 2011/0239781 | A1* | 10/2011 | Petroff | G01F 1/002 |
| | | | | 73/861.28 |
| 2014/0132086 | A1 | 5/2014 | Matsumoto | |
| 2016/0069677 | A1* | 3/2016 | Garvey | G01B 21/04 |
| | | | | 33/503 |
| 2017/0165803 | A1 | 6/2017 | Nakayama | |
| 2017/0350115 | A1* | 12/2017 | Rocher | B33Y 10/00 |
| 2018/0099419 | A1* | 4/2018 | Hoshino | B25J 21/00 |
| 2018/0147645 | A1 | 5/2018 | Boccadoro et al. | |
| 2018/0221990 | A1* | 8/2018 | Aoki | G02B 26/10 |
| 2018/0338090 | A1* | 11/2018 | Iida | G06T 7/73 |

FOREIGN PATENT DOCUMENTS

| | | |
|---|---|---|
| EP | 3326749 A1 | 5/2018 |
| EP | 2785492 B1 | 5/2019 |

\* cited by examiner

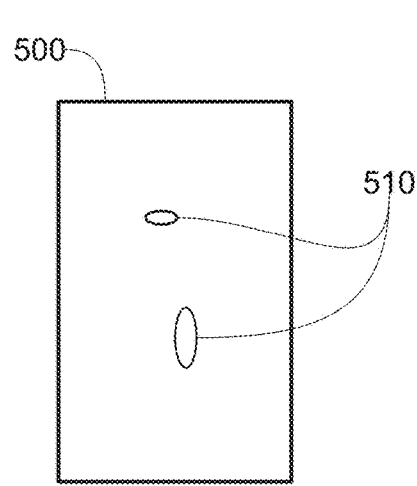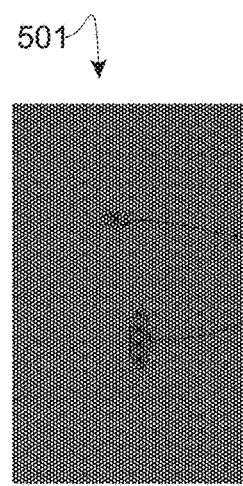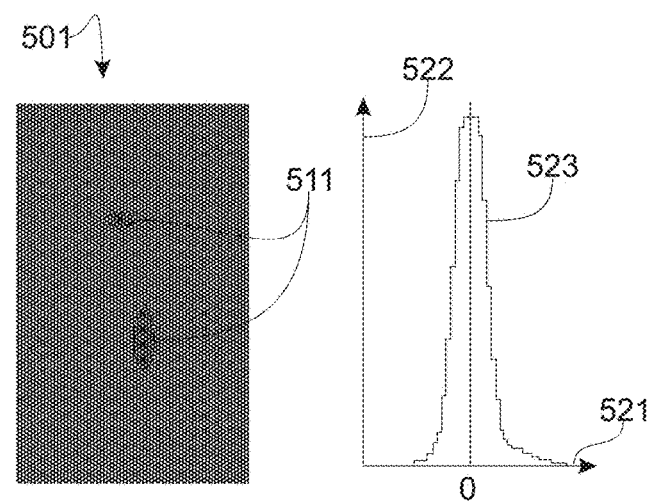
Fig. 5A   Fig. 5B   Fig. 5C
Fig. 5

METHOD AND DEVICE FOR CONTROLLING A WORKPIECE DURING ITS MANUFACTURING

RELATED APPLICATIONS

This application is a 371 application of PCT/EP2020/062330 filed May 4, 2020, which claims priority from French Patent Application No. 19 04696 filed May 3, 2019, each of which is incorporated herein by reference in its entirety.

FIELD OF THE INVENTION

The invention relates to the field of manufacturing, more particularly, but not exclusively, additive manufacturing, machining by material removal or a combination of these manufacturing methods.

The invention relates more particularly to the automated dimensional inspection of a workpiece made by this type of process on a machine tool, or in a palletized transfer cell, between two manufacturing operations, that is to say, without unclamping or repositioning the checked workpiece that remains clamped in its part-holder, either in the machine or on its pallet.

The method and the device of the invention are suitable for any type of series, from unitary manufacturing to mass production.

BACKGROUND OF THE INVENTION

According to exemplary embodiments, the manufacturing of a part comprises shaping steps, organized according to a manufacturing sequence and implementing one or more machine tools operating by material removal or by material addition on a rough or a blank, in order to create geometrically defined shapes and gradually bring the shape of said part closer to its final shape.

Document EP 2 785 492 describes examples of a part manufacturing comprising machining operations, combining additive manufacturing and material removal, as well as examples implementing an intermediate dimensional measurement between two manufacturing operations.

By convention, kept throughout the text, a manufacturing sequence is divided into a succession of phases and includes at least one phase.

Each phase is divided into a succession of operations, a phase comprising at least one operation.

Thus, when the manufacturing sequence takes place on a single machine tool, a phase corresponds to a succession of machining operations, by material addition or material removal, during which the positioning of the workpiece in the machine tool is not modified and during which the configuration of the machine is not modified either.

By extension, in the following text, in the case where a manufacturing sequence implements a palletized cell comprising a plurality of machine tools and a transfer of the workpiece on its part-holder from one machine to another, a phase corresponds to a succession of operations, possibly taking place on several machines, during which the workpiece remains clamped in position on its pallet. Thus, the workpiece is transferred from one machine to another on its pallet, said pallet comprising positioning means in the machine that ensures a precise and reproducible positioning of the pallet, and consequently of the workpiece, in the space of said machine tool.

The invention relates to the automated dimensional inspection of a workpiece during its manufacturing, aiming more particularly at three-dimensional characteristics, said inspection being carried out during the same phase, that is to say, while the workpiece remains clamped in its part-holder, the latter being specific to the machine, or when the workpiece remains clamped on its pallet.

This dimensional inspection aims, in particular, to adapt subsequent machining operations, as a function of the result of the preceding machining operations.

On a numerically controlled machine tool, this adaptation consists in modifying predefined correction parameters in the machine control program or in the control unit of said machine, or in more advanced cases, in modifying the trajectories of the effectors during the subsequent operations.

In order to perform such a correction, the accuracy of the entire correction chain, including the measurement, the determination of deviations from a target or an input/command, the determination and application of the corrections, shall all be compatible with the parts manufacturing tolerances.

Usually, these tolerances correspond to a precision lying between quality 5 and quality 10 according to the ISO 286-1 standard, i.e., to give an order of magnitude, between $1.5/10,000^{th}$ and $15/10000^{th}$ of the checked dimension.

Such a precision in the correction chain cannot be obtained if the workpiece is removed from its part-holder during the inspection. Therefore, said check operation must be carried out without a change of manufacturing phase.

Document EP 2 785 492 describes an example of such a check operation carried out with a device comprising various effectors, including a control probe, in a single machining head.

In this device of the prior art, the control effector makes it possible to acquire, in the reference of the machine, points located on the workpiece being machined, during a probing operation, without unclamping the workpiece and without changing the configuration of the machine.

These probed points are then used to determine the geometries and in particular to check the compliance with the manufacturing dimensions.

However, this device of the prior art is slow, in particular if many points have to be acquired, for example to reveal surface defects in three dimensions, such as a flatness or a cylindricity.

This device of the prior art is only applicable to one type of machine, comprising means, like a spindle, capable of holding this type of sensor, therefore, such a system is generally not applicable to a NC lathe. and even less to a palletized transfer cell.

In addition, the realization of a measurement, and more generally the acquisition of points on a surface of the workpiece, when this acquisition is carried out in the manufacturing environment, presents difficulties related to this environment, generally crowded, and in particular with chips or cutting fluid on the inspected surfaces, which can tamper the measurements and lead to erroneous interpretations.

This type of probing measurement, exerting a pressure on the surface, is not suitable for checking flexible surfaces.

Finally, this device of the prior art uses information from the coders or of the digital rules of the motion axes of the machine tool to obtain the measurements. As a result, uncertainties related to these axes occur both during the measurement and during the machining trajectories, and as a result, some errors cannot be detected.

Document EP 3 326 749 describes an inspection device adapted to an electro-discharge machine in which a two-dimensional image of the surface of a workpiece is acquired by an electronic camera during the machining of the workpiece in order to determine a roughness parameter of that surface.

SUMMARY OF THE INVENTION

The invention aims at solving the deficiencies of the prior art and for this purpose pertains to a device adapted to the inspection of a workpiece during its manufacturing, while clamped in its part-holder, said inspection being carried out while the workpiece is in a machining system, the inspection being carried out in the same phase following a machining operation, the device comprising—a part-holder for positioning and holding in position the workpiece in the machining system; a protected work area to access the work volume of the machining system;
- a measuring sensor suitable for the acquisition of points on the surface of the workpiece;
- a poly-articulated robot located outside the work volume of the machining system and capable of supporting and moving the measurement sensor;
- a support carriage carrying the robot and able to move the robot relative to the machining system; a computer with memory means, computational means and means of display, including in its memory a three-dimensional digital model of the workpiece, and a computer program to pilot the device and carrying out the operations consisting of:
- i) moving the robot by means of the carriage to enable it to reach the protected work area;
- ii) positioning the sensor relative to the workpiece by means of the robot;
- iii) acquiring the coordinates of a plurality of points on a surface of the workpiece with the sensor and recording said coordinates in the memory means;
- iv) comparing the position of the points acquired in step iii) with the three dimensional digital model comprised in the memory means of the computer.

Thus, the device's means for carrying out the measurement, including the robot and the measuring sensor, are located outside of the work area when not performing a measurement operation, is adaptable to any machining system configuration that includes a single machine, or a plurality of machines organized in a palletized transfer cell. It is easily adaptable to any existing machining system even if the latter is not initially designed to include such a device.

The measurement is independent of the motion axes of the machine and of their possible flaws.

The invention is implemented according to the embodiments and the variants set out below, which are to be considered individually or according to any technically operative combination.

According to an advantageous embodiment, the device of the invention comprises means for measuring the positioning of the measurement sensor in the protected work area. Thus, the measurements taken are easily relocated in a reference system of the machining system.

Advantageously, the measuring sensor is a contactless sensor, notably an optical sensor. This type of sensor is able to acquire a plurality of points without moving the robot during the acquisition, the sensor remaining in a steady position at the time of acquisition, or, if necessary, by combining acquisitions and motions of the robot between said acquisitions. The device can thus assess dimensions on geometric entities alone (planes, cylinders, holes, pockets, . . . ) or combined (perpendicularity, parallelism, coaxiality, . . . ) as well as surface conditions (flatness, cylindricity, . . . ) or, at finer levels of detail (waviness, roughness, . . . ).

Advantageously, the machining system comprises a door to access the protected working area and the device of the invention includes a contactless presence detection device protecting the access to the protected working area when the door is open, especially during steps (ii) and (iii). Thus, the control operation is safely conducted even though the machining system is in an "open door" configuration.

According to an embodiment, the machining system is a palletized transfer cell, comprising a plurality of machines, the part-holder on which the workpiece is clamped being a pallet and it includes an intermediate inspection station, between two machines, for checking of the workpiece thus clamped on its pallet. Thus, the inspection is simplified by limiting the clutter of the environment around the workpiece during the check operation.

The invention also pertains to a method implementing the device of the invention according to any of its embodiments, including a step consisting in uploading into the memory means a three-dimensional digital model of the workpiece for the implementation of step iv) in which the aforesaid three-dimensional digital model of the workpiece corresponds to the state of that workpiece at the end of the machining operation immediately preceding step i). Thus, during step iv), the check operation compares the practical state of the workpiece to its theoretically expected state at the time of the inspection.

The method of the invention is advantageously implemented in a condition in which the inspected workpiece is contaminated by residues such as chips or cutting fluid, and comprises, during step iv), steps comprising:
- a) adjusting a reference surface from the three-dimensional model to the plurality of points acquired during the step (iii);
- b) classifying dimensional deviation in the acquired points relative to this surface in classes;
- c) determining the standard deviation from class distribution to the reference area;
- d) excluding from the analysis the acquired points remote by more than one standard deviation from the reference surface.

According to an embodiment, the three-dimensional digital model of the workpiece corresponds to the condition of the workpiece at the end of the machining operation immediately preceding step i).

Thus, the method of the invention voids the influence of artificial singularities on the inspected surface.

BRIEF DESCRIPTION OF THE DRAWINGS

The invention is described hereunder according to its preferred embodiments, by no way limiting and in reference to FIGS. 1 to 6 in which:

FIG. 1A shows a raw cylindrical bar, FIG. 1B shows shaping operations, FIG. 1C shows the milling operations on multiple planes, and FIG. 1D shows the final part machined by material removal starting from a raw cylindrical bar of FIG. 1A;

FIG. 5 illustrates the processing of the plurality or cloud of points that is carried out to eliminate the influence of singularities, FIG. 5A gives a schematic example of a surface comprising traces of cutting fluid, FIG. 5B represents the corresponding cloud of measurement points and FIG. 5C represents the distribution of the deviations with respect to the theoretical mean plane of the points of this cloud.

DETAILED DESCRIPTION OF THE EMBODIMENTS

The implementation of the device and of the method of the invention are explained in the framework of a first embodiment and the example of a part obtained by turn-milling made on a combined CNC turn-milling center.

The invention is however not limited to this type of machine and applies to any type of machine for manufacturing by material removal, material addition or combination thereof, in configurations of turning, milling, plane or cylindrical grinding or combined, on machines with serial kinematics or parallel kinematics, as well as in a transfer cell comprising multiple machines, without these examples being limiting.

Figure 3:
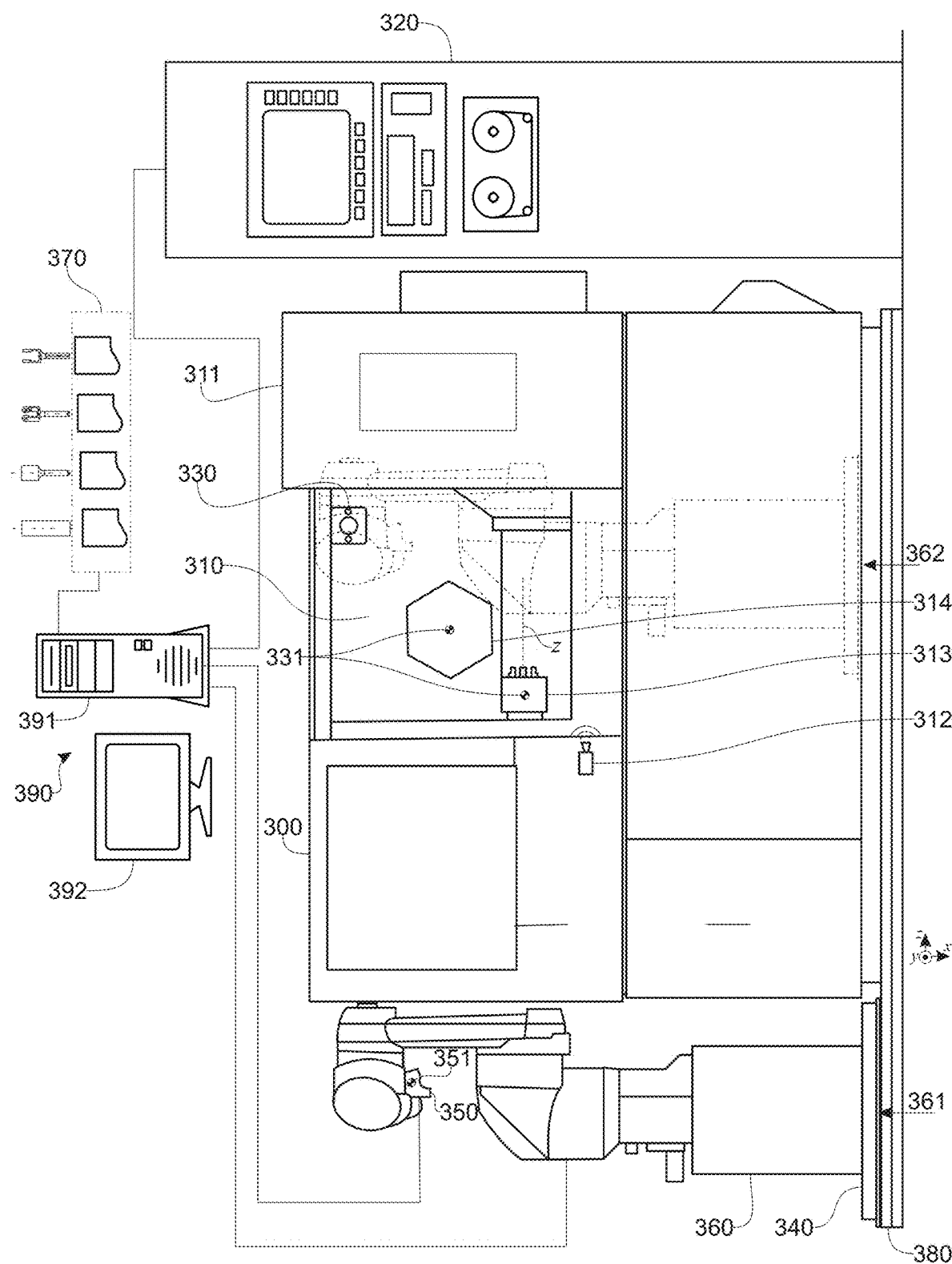
FIG. 3 is a comprehensive view showing the principle of the device of the invention according to an exemplary embodiment.

FIG. 3, according to an exemplary embodiment, in a turn-milling center, the workpiece is held in a part-holder such as a rotating chuck (313), which chuck is used for positioning and holding the workpiece in position in the machine, as well as to impart to the workpiece a rotating cutting motion around a z axis.

The z axis may be horizontal or vertical.

According to a usual and nonlimiting exemplary embodiment, a turret (314) is borne by a carriage and holds a plurality of turning tools, interchangeable by the rotation of the turret, which carriage is able to move parallel to the axis z around which the workpiece is spinning, as well as along an x axis perpendicular to the latter, according to numerically controlled motions, with programmed velocities and positions, to carry out turning operations, that is to say, to generate shapes having a rotational symmetry with respect to the z axis, by material removal.

Some machines have multiple turrets and multiple carriages, which are also able to move along a y axis perpendicular to the z and the x axes.

This type of machine generally comprises an axial carriage, able to move along the z axis and to perform, for example, drilling and reaming operations along the z axis in the center of the workpiece, the cutting motion being communicated to the workpiece.

The machine further comprises a carriage bearing a motorized spindle capable of holding a milling, a drilling or a boring tool to which the cutting motion is communicated by said motorized spindle.

The carriage bearing this spindle is capable of moving along the x, the y and the z axes of the machine, and even according to a rotating axis around the x axis, by means of numerically controlled motions enabling programmed velocity and position, in order to carry out milling operations.

The chuck is also numerically controlled. During a turning operation, the chuck communicates to the workpiece the cutting speed corresponding to the aforementioned operation, during a milling operation, the chuck is either moved in a programmed steady position or used to communicate to the workpiece a feed motion adapted to the milling operation.

Figure 1:
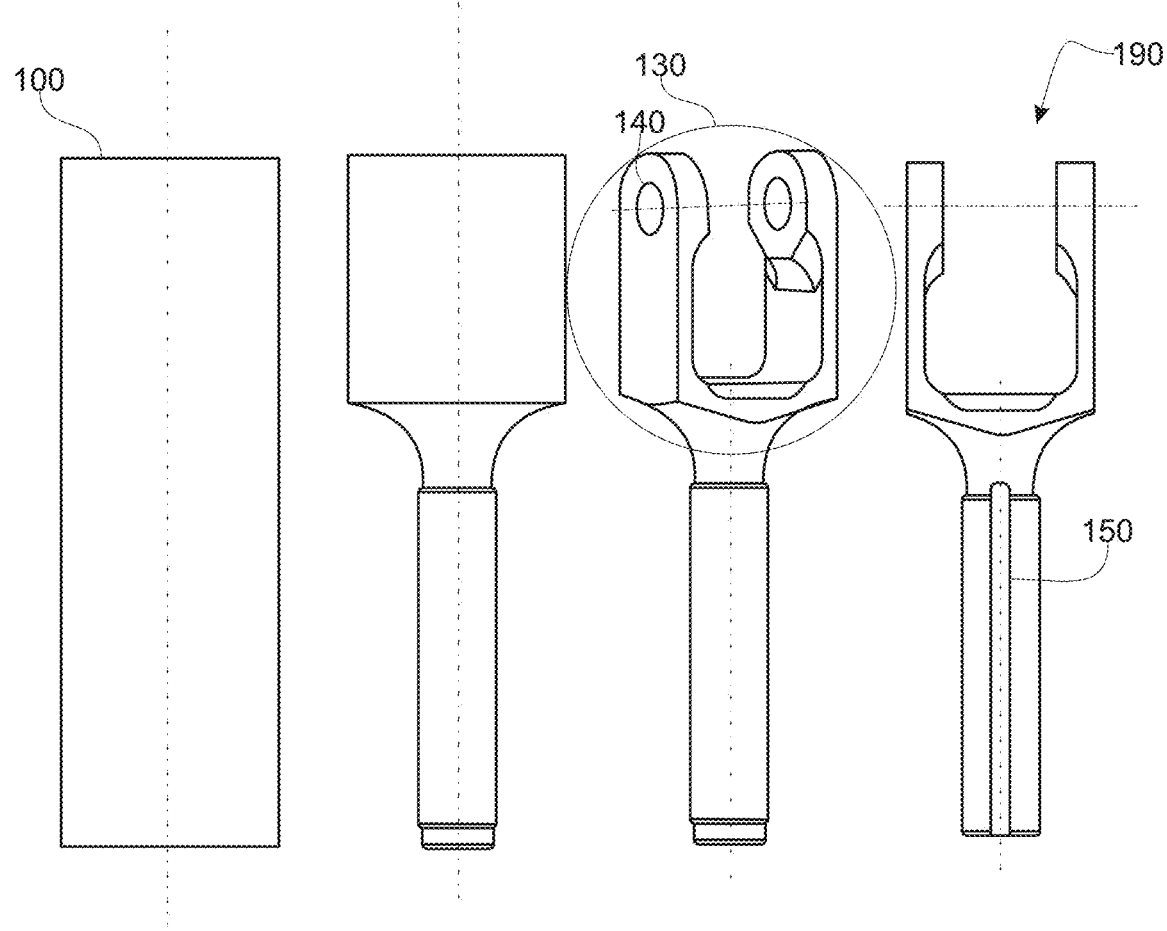
FIG. 1 is an example of a part made by material removal and implementing inspections by means of the device and of the method of the invention.

FIG. 1, according to an exemplary machining of a part implementing the method and the device of the invention, the final part (190, FIG. 1D) is machined by material removal starting from a raw cylindrical bar (100, FIG. 1A).

According to an exemplary embodiment, the part is machined in a single phase, i.e., without changing the positioning of the workpiece in the machine, but alternatively it may be machined in two phases, for example with a turnaround between the states corresponding to FIG. 1B and to FIG. 1C.

The machining operations include operations in longitudinal turning for shaping the workpiece from the state of the FIG. 1A to the state of FIG. 1B then milling operations on multiple planes as well as drilling-boring operations for the machining of the fork (130) and of the hole (140) of the aforesaid the fork, shown in FIG. 1C, and a slot milling operation for making the groove (150) shown FIG. 1D.

Finally, a cutting operation separates the part (190) from the remaining raw bar.

The method and the device of the invention are implemented in order to perform inspection operations at intermediate stages between 2 machining operations.

Thus, as a nonrestrictive example, a first inspection operation consists in checking, with reference to FIG. 1B, the positioning and the diameter of the rough cylindrical portion that will become the fork, a second inspection operation consists in checking the fork (130) and the hole (140) during or after the corresponding milling operations.

As a for instance, the checks to be realized during this second inspection operation are dimensional checks such as the diameter of hole (140) or the opening of the fork (130). Such dimensional checks may be performed, without unclamping the workpiece, by probing methods known from the prior art.

On the other hand, geometrical inspection may also concern, as a for instance, the parallelism of the outside faces (231, 232) as well as of the interior faces (241, 242) of the fork, the perpendicularity of the hole axis (245) relative to the faces (231, 232, 241, 242) of the fork, as well as relative to the axis of the cylindrical part (200) of the workpiece, or the symmetry of the branches of the fork relative to the cylindrical part (200), or also the coplanarity of the hole axis (245) and the axis of the cylindrical part (200). The performance of those geometrical inspections requires a three-dimensional analysis.

The person skilled in the art understands that if the workpiece was to be disassembled from the machine and be placed in a three-dimensional measurement machine to carry out these inspections, it would then be impossible to reposition the workpiece in the machine with sufficient a precision to carrying out the subsequent operations, would be this only because the workpiece would had then be separated from the raw bar.

Moreover, most of these inspections cannot be performed with the appropriate precision by way of a probing means using the information delivered by the axes of the machine as measurement, regardless of the intrinsic accuracy of the probe.

Indeed, taking as an example the machining of the outside surfaces (231, 232) of the fork, these are made in milling while the workpiece is hold in the chuck of the turn-milling center.

Thus, the chuck is indexed in a given angular position and a first surface (231) is made in face milling.

Then, the chuck rotates 180 degrees from the first angular position, indexes in this position and the second surface (232) is made.

To illustrate the technical problem, we assume that the machine has a specific precision and that during the rotation of the chuck between the two milling operations, it rotates 180 degrees +/− epsilon where epsilon is an angular positioning error. Thus, everything else being perfect in such a situation, the surfaces will have parallelism angular defect of +/− epsilon range depending on the part.

During a geometrical check of these surfaces by probing, it will be necessary to proceed in a similar way, namely, to probe the first surface (231) and then to rotate the chuck by 180 degrees and to probe the second surface (232). Obviously, the rotation carried out by the chuck during this probing operation will be tainted by the same uncertainty of +/− epsilon.

Therefore, if the same positioning defect is reproduced during the machining and during the measurement, the angular defect of parallelism between the flat surfaces (231, 232) of the part will not be detected, or, depending on the case, will be amplified or underestimated, if the positioning error is not replicated to the same between the machining and the probing. In all cases it is impossible to reliably assess this parallelism defect by probing and using the information of the axes of the machine to make the measurement.

The same is true for the direction of the axis (245) of the hole in the fork.

FIG. 3, according to an exemplary embodiment, the device of the invention includes a numerically controlled machine tool (300), such as a turn-milling center in this example. The aforementioned machine tool comprises a protected work area (310), corresponding to the area in which the workpiece is transformed, accessing that secure area being protected by a door (311) and security means so that, when said door is opened, the machine can only operate in a so-called security mode, the modalities of which vary according to the machines, but that prohibits any actual machining operation.

The work area (310) includes a part-holder (313), such as a chuck in this example. It also includes a tool-bearing turret (314) for performing machining operations.

For performing machining operations, the machine is controlled by a programmable numerical controller unit (320).

The device of the invention comprises a poly-articulated robot (360) of the anthropomorphic type according to this nonlimiting exemplary embodiment, which robot is mounted on a support cart (340) to move said robot (360) relative to the machine (300), for example on a rail (380), in particular in order to bring the robot closer or away from the protected work area (310) of the machine.

Thus, when the robot (360) is in a retreat position (361), it is possible to access the machine easily, as an example for loading the raw part or for unloading the finished part, or else to install tools in the turret (314).

The robot (360) may also prepare the raw part loading operation while it is in the retreat position (361).

Advantageously, the inspection position (362) and the retreat position (361) are also used for loading the raw part or for unloading the finish part in the part holder (313).

To carry out an inspection, the robot (360) is moved in a so-called inspection position (362) in which it can access the machine working protected area (310) once the door (311) is open.

To this end, the device of the invention includes a light barrier or a zone radar (312) protecting the access to the protected working area (310) during steps (ii) to (iv) and also, from an overall point of view, to the areas swept by robot (360) motions. This device makes it possible to secure the protected area (310) when the door (311) of the machine is opened as well as the swept area when the robot moves between the retreat position (361) and the inspection position (362) or when it is moving in one of these two positions.

The robot (360) holds and is able to move a contactless measuring sensor (350). According to an exemplary and nonlimiting embodiment, this sensor is an optical sensor emitting a laser beam describing a line that is reflected on the surface of the workpiece. An optical device measures the distortion of this line when reflected by the surface, and thus determines the profile of the latter according to the projected line as well as the distance to the laser source.

Advantageously, the sensor comprises its own high precision means to move the laser beam in a given measurement volume.

Thus, as long as the measurement is performed in the measurement volume of the sensor, the robot (360) bearing the aforementioned sensor remains motionless.

Other optical measurement technologies may be used, for example the projection of a pattern of laser lines, which according to a principle similar to the one exposed hereinabove for a single line, makes it possible to get a three-dimensional measurement of the controlled surface in a single shot, by measuring the distortion of said pattern when reflected by the checked surface.

According to another embodiment, the measurement is performed by means of a combination of multiple optical sensors carried by the robot.

The system comprises a supervisor (390) comprising a computer (391) with memory means and computation means, as well as input means and a display (392).

The supervisor is connected and exchanges information, via one or more computer programs, with the digital control unit (320) of the machine tool, with the robot (360) and its mobile cart (340) in particular to move the robot according to its axes and relative to the machine, as well as with the measuring device (350) in particular in order to retrieve the coordinates of the points in the cloud of points acquired by this device.

Advantageously, the supervisor includes in its memory means a plurality of CAD (Computer Aided Design) files (370) corresponding to the geometric definitions of the workpiece during the successive stages of its machining and in particular at the stages when an inspection is carried out.

According to various embodiments, the CAD files are imported into the supervisor's memory means from a remote server (not shown) or are created by a resident software in the supervisor.

Advantageously but without limitation, these CAD files (370) give a three-dimensional representation of the workpiece at the considered machining stage.

Figure 4:
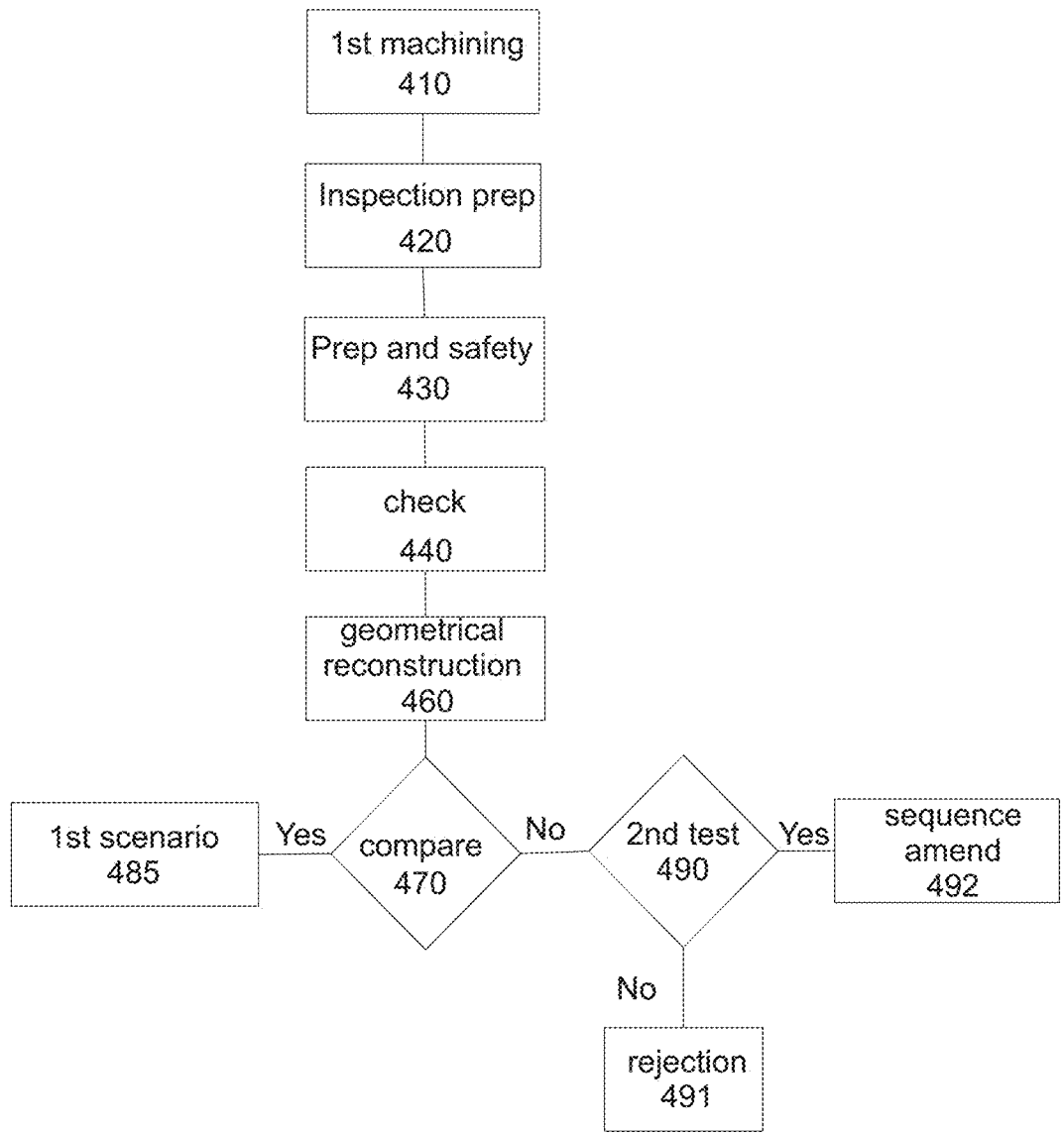
FIG. 4 is an exemplary flowchart of the method of the invention.

FIG. 4, according to an exemplary embodiment of the method of the invention, it includes a first machining operation (410).

Positioning the raw part in the machine tool is a machining operation. Subsequent machining operations follow according to exemplary embodiments.

During an inspection preparatory operation (420) the machining operation either by material removal or by material addition is stopped, the axes of the machine are cleared and stopped in a waiting position so as to free the protected work area of the machine and to allow the robot to access it.

The inspection is planned in the machining program.

According to an embodiment, the inspection is part of the original machining sequence that is recorded in the digital control unit of the machine tool.

According to another embodiment, a modified machining sequence, comprising the inspection is generated by the supervisor and is transmitted to the digital control unit of the machine.

Thus, the supervisor advantageously makes it possible to modify the machining sequence and to send the corresponding program to the digital control unit of the machine.

The aforementioned digital control unit dialogues with the supervisor and informs it when the machine configuration is ready to carry out the inspection. The workpiece remains in position in the working area of the machine.

According to a preparatory and safety step (430), the supervisor orders the opening of the door of the machine or informs an operator to proceed to this opening.

With the door being open, the supervisor orders the robot to move on its cart and triggers the associated safety system (light barrier or zone radar).

The inspection can then safely begin.

During a check operation (440) the measuring sensor, borne by the robot, is used to acquire a plurality of points on the surfaces of the workpiece to be inspected.

To this end, the robot moves the sensor according to a defined configuration, calculated in order to obtain optimal visibility for all surfaces to be checked in this position without having to move the axes of the robot or the robot itself.

The determination of this so-called optimal visibility position is obtained by calculation, prior to the inspection.

The aforementioned position of optimal visibility depends on the technology and on the performances of the implemented device of measurement, the environment of the machine in its working area as well as the surfaces to be checked and the position of the aforesaid surfaces in the machine at the time of the inspection.

These calculations take into account, among other things, the geometric modelling of the machine (300), of the robot (360), of the sensor and the machined workpiece.

Therefore, the position of optimal visibility is actually a combination of the positions of the workpiece to be inspected, of the robot bearing the measuring device and of the axes of the robot.

According to an embodiment, the part-holder is moved between these acquisitions so as to uncover surfaces that are hidden in a given configuration.

This motion is controlled or triggered by the supervisor via the digital control unit.

Thus, in the above example, the chuck holding the workpiece rotates 180 degrees to allow the contactless sensor to gain visibility on the two outer surfaces of the fork.

However, because the measurement sensor is contactless, it simultaneously acquires a multitude of points, and because the positioning of the system in the protected work area is independent of the machine's axes, this rotation is broken down into three 60-degree rotations or in four 45-degree rotations.

In general, determining the visibility or optimal visibility of the surfaces of the workpiece to be inspected, ensures that there can be sufficient overlapping of the acquisition areas, depending on the characteristics of the sensor, so that the digital image of the workpiece can be reconstructed by assembling the different views and registration of them relative to each other.

Thus, the three-dimensional acquisition, allows, starting from these data, to assemble them according to criteria of minimization of deviation and thus to reconstruct the complete geometry, regardless of the precision of the motion and of the angular positioning of the chuck.

Thus, the parallelism between the two outer surfaces of the fork (231, 232, FIG. 2) may be checked regardless of the accuracy of the machine tool, even though the motion of the axes of the aforesaid machine are used while performing the measurement.

During a step of geometrical reconstruction (460), the different views obtained are assembled so as to obtain a three-dimensional digital representation of the checked area.

During a comparison step (470), the aforesaid digital representation is compared to the CAD file of the workpiece in the given manufacturing stage and as recorded in the memory means.

To this end, the cloud of points corresponding to the measured digital representation is three-dimensionally balanced relative to the CAD model using deviation optimization techniques, which consist of moving the cloud of points in the virtual space according to a defined number of degrees of freedom, so as to minimize the deviations between the CAD model and the aforesaid cloud of points.

According to a comparison step (470) the residual deviations between the CAD model and the cloud of points are compared to admissible control values, which control values are recorded in the memory means of the supervisor and are associated with the different geometric entities that are compared with the considered CAD model.

Admissible control values are defined so that a defect can be detected before it can no longer be corrected in the manufacturing process (for example, if too much material has been removed); therefore, control values are rarely the expected final dimensions and final tolerances, except in the case of a control performed at the last manufacturing stage.

Three scenarios are then possible and each of these scenarios can be applied to each of the checked geometric entities, each of the checked admissible control values, or to the inspected workpiece as a whole.

Thus, the comparison step first checks if deviations of the inspected element (dimension, geometric entity or the workpiece as a whole) relative to the reference geometry are compliant with the admissible control values.

If the answer is yes, according to a first scenario (485), the robot is moved out of the protected work area, then moved to its retreat position, the machine door is closed, and the manufacturing cycle resumes in compliance with the planed manufacturing sequence.

If the answer is no, and if the observed deviations are not compliant with the admissible control values, then a second test (490) is conducted to assess whether the situation can be remedied or not.

An example of a situation that cannot be remedied with reference to the exemplary workpiece of FIG. 1C, would be a hole (140) diameter that is greater than the maximum allowed diameter.

Figure 2:
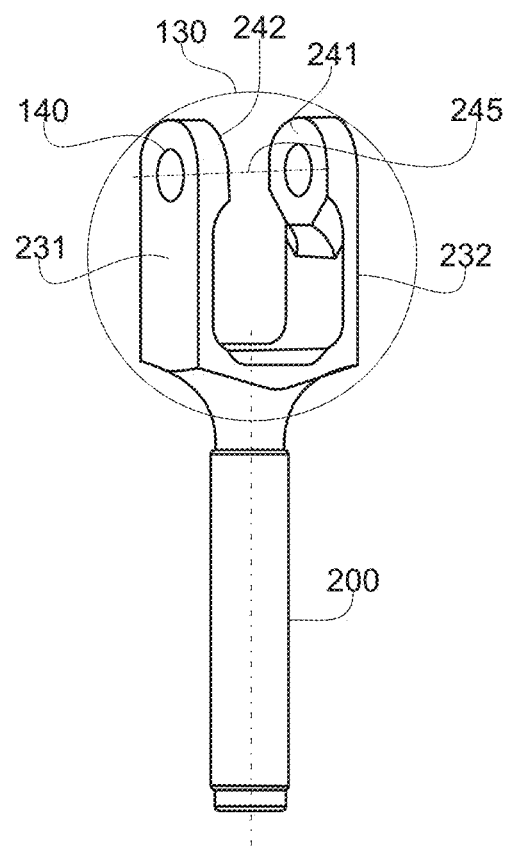
FIG. 2 shows the part shown in FIG. 1 in a configuration of a machining sequence during which an inspection is carried out.

Another example of a situation that cannot be remedied with reference to the same workpiece, FIG. 2, would be where the diameter of the hole (140) being at its maximum allowable value, so the hole is compliant from this standpoint, but where perpendicularity defect and/or coplanarity of its axis (245) relative to the axis of the cylindrical part (200) are out of tolerance.

In these nonlimiting examples, the situation cannot be remedied and according to an end step (491) the machining sequence is interrupted, and the workpiece is rejected.

Thus, the device and the method of the invention enable, more specifically in the case of a mass-produced part, to reject the part as early as possible.

In such a rejection case, the manufacturing sequences and the tool correctors implemented during the operations that led to the noncompliance with the tolerances are analyzed before starting the manufacturing of a new part and if necessary, corrected.

When appropriate, the machine geometry is checked.

Therefore, the device and the method of the invention can detect as early as possible a machine tool calibration issue but also a tool wear issue or a tool bending issue and avoids keeping production with a machine being off calibration.

Alternatively, the situation can be remedied, i.e., the deviations between the CAD model and the measured digital representation are incompatible with the admissible control values but can be reduced to acceptable tolerances to avoid the rejection.

Therefore, in a repairable situation, the part can be brought back into compliance after the inspection step, either by interspersing one or more machining operations and/or by modifying program instructions or the tool correctors during the manufacturing operations subsequent the operation preceding the inspection.

As a for instance, a repairable situation is the case where, FIG. 1C, the measured diameter of the hole is smaller than the expected final diameter.

If the difference between the machined diameter and the allowed maximum diameter given the final tolerance is greater than the minimum chip thickness allowed by the machining technology, then it is possible to re-ream the aforesaid hole, by interspersing an additional reaming operation in the machining sequence so as to bring the hole to a diameter within its final manufacturing tolerance.

In such a case, an additional reaming operation is introduced into the original manufacturing sequence.

Thus, in the case of a repairable situation, during a step (492) of sequence amendment, the manufacturing sequence is modified, in particular by the addition of additional operations, with possible correction of the program or associated correctors so that the error, although repairable, does not happen again on the subsequent workpieces.

According to variant embodiments, the steps of continuing manufacturing (485), workpiece rejection (491) or amendment of the machining sequence (492) are carried out automatically, for example by implementing principles of artificial intelligence, by an assisted human intervention or combination thereof.

Thus, the device of the invention and its method of implementation are adapted both to quasi-unit manufacturing of high value-added parts and to large-scale manufacturing as part of the automation of manufacturing surveillance.

According to an advantageous embodiment, the device of the invention comprises means for locating the measurement sensor in the reference of the machine tool.

FIG. 3, according to variants, the measuring device itself is used to determine its own position in the machine, for example by measuring one or more particular reliefs, such as spheres or targets (331), positioned at specific points known to the machine, or, the wrist of the robot holding the measurement sensor, or the measuring sensor it itself, comprises specific means of detection, such as a reflector (351), a prism or a sphere that cooperate with a fixed detection device installed in the machine, such as a miniature laser tracker (330).

According to another variant these two alternatives are combined, for example, the fixed laser tracker (330), installed in the machine, is able to measure the position (distance, angle) of a reflector (351) installed on the robot or on the sensor and compares this position with the known position of fixed targets (331) installed in the machine in order to improve accuracy.

Determining the position of the measurement sensor in the machine improves the accuracy and relevance of program corrections during the step of the machining sequence amendment (492).

This position information is also useful in the case of a large workpiece where visibility conditions involve performing the measurement using multiple positions of the robot and without a distinctive reference in the sensor beam.

The precise positioning of the successive positions of the measuring device in the machine space, allows each acquisition to be relocated into a common reference.

The automatic measurement makes it sensitive to the presence of residues, chips, cutting oil, on the surfaces to be inspected, which are likely to be confused with machining defects.

According to an exemplary embodiment, in order to limit this phenomenon, the workpiece to be inspected is subjected to a blowing of compressed air and/or mechanical cleaning before the performance of the inspection.

According to variant embodiments, the means of cleaning or blowing are borne by the machine tool or by the robot.

This cleaning operation eliminates solid residues such as chips, but on the other hand, is less effective with the drops of cutting fluid that may remain on surfaces.

To this end, the method of the invention implements a method of information processing that eliminate these measurement artefacts or at least that detects them when they occur.

FIG. 5, for illustration purpose of the principle of this processing, we consider the control of a geometric entity, here a flat surface (500) in FIG. 5A.

The person skilled in the art understands that the principle is applicable to the check of any geometric entity, plane, cone cylinder, surface of any kind, as long as it is known, that is, it can be defined by a reference surface.

From a practical point of view, the reference surface is known from the CAD file corresponding to the entity to be controlled.

The flat surface to be controlled is, according to this example, contaminated by several drops (510) of cutting fluid.

FIG. 5B, the acquisition of the cloud of points corresponding to the surface reveals localized extra thicknesses (511) corresponding to the aforesaid drops.

During an adjustment operation, the geometric entity, here a plane, is adjusted to the plurality of points (501) obtained by the measurement, for example by a least square based method.

FIG. 5C, the deviations from this reference area of all points of the cloud are sorted by classes. The tracing of the number of points (522) in each deviation class (521) provides a statistical distribution (523) centered around the altitude of the theoretical surface, here an average altitude plane 0, the aforesaid statistical distribution is characterized by a standard deviation.

These deviations account for both real geometric defects of the surface, but also for the presence of singularities such as drops of cutting fluid.

The inventors found that the actual geometric defects spread over +/−1 standard deviation around the mean value. Thus, the presence of points farther than one standard deviation from the mean surface correspond to singularities, which are thus detected and allow to generate a warning about the reliability of the measurement, or alternatively, the corresponding points are simply skipped from the analysis, or replaced by points at the mean altitude value of the surface.

Thus, by this simple numerical treatment of the cloud of measuring points, artefacts such as the presence of cutting oil but also chips on the controlled surface are eliminated while generating an alert on the carried-out processing.

The person skilled in the art will understand that the presence of a defect located under a drop is unlikely and that, in the prior art, the detection of such a defect, if it existed, would probably not be detected by a three-dimensional measuring machine; indeed, if the ratio of the surface of the drop to the controlled plane is low (<1% of the total surface for example), it is statistically unlikely that the checkpoints defined at the three dimensional measurement machine will be located in the concerned surface.

Figure 6:
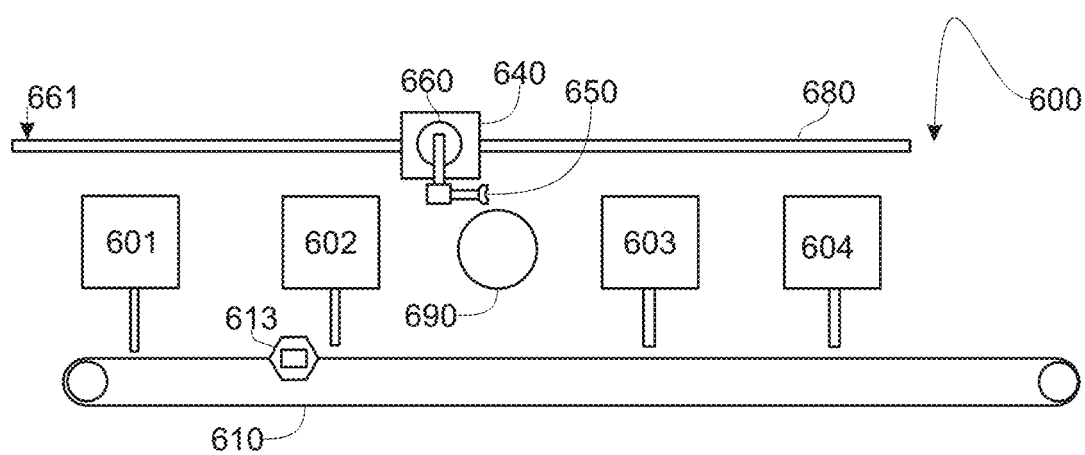
FIG. 6 schematically shows, on a top view, an example of integration of the device of the invention in a palletized transfer cell.

FIG. 6, the person skilled in the art adapts the principles discussed hereinabove for the case of a single machine to the one of a manufacturing transfer cell (600).

According to a schematic embodiment, the aforesaid transfer cell, includes a plurality of machines (601, 602, 603, 604) and a transfer device (610), allowing to move the workpiece, mounted, positioned and clamped on a pallet (613) from one machine to another according to a defined manufacturing sequence, as well as loading and unloading the workpiece set on its pallet (613) in each machine.

According to known characteristics, the palette includes precise positioning means that cooperate with the means of each machine so as to precisely and reproducibly position and clamp the pallet in each machine.

The operation of the transfer cell is controlled by a control unit (not shown).

The device of the invention comprises a robot (660) set on a cart (640) allowing its movement in the transfer cell (600), for example on a rail (680). Thus, the robot can move between one or more retreat positions (610) and one or more inspection positions.

The robot carries a contactless sensor (650) for example an optical sensor.

Thus, according to an embodiment, the device of the invention is adapted to carry out a measuring operation in each machine of the cell wherein the workpiece is set up on its pallet.

According to a specific embodiment, the transfer cell comprises a specific inspection station (690).

Advantageously, it includes means for loading and unloading the workpiece, set and clamped on its pallet, in the aforesaid inspection station, the latter including means for positioning the pallet reproducibly.

According to a more advanced exemplary embodiment, the inspection station comprises a plate, adapted to hold the pallet (613) and to perform one or more motions numerically controlled by the control unit of the transfer cell.

According to an alternative embodiment, the inspection station is simply a specific location in the transfer cell.

Regardless the embodiment, the inspection station in the transfer cell takes advantage of the precise positioning capacity of the pallet (613) in the different machines to carry out the check operation in a less crowded environment conditions and improving the three-dimensional visibility of the workpiece.

The workpiece remains positioned and clamped on the pallet during the check operation.

The above description and the exemplary embodiments show that the invention achieves its intended purpose and allows the automatic in situ inspection of a workpiece during its manufacturing on a machine tool or in a transfer cell without a change of the manufacturing phase.

The device of the invention does not require a special design of the machine tool and is adaptable to any existing machine tool or transfer cell.

The invention claimed is:

1. A device to control a workpiece clamped to a part holder in a machining system during a machining operation, the control being performed when the workpiece is in a machining system and in a same phase following the machining operation, the device comprising:
    the part holder to set and hold in position the workpiece in the machining system;
    a protected work area comprising an access to a work volume of the machining system;
    an optical contactless sensor acquires a plurality of points on a surface of the workpiece to determine a profile of the workpiece by emitting a laser beam describing a line that is reflected on a surface of the workpiece and measuring a distortion of the line;
    a poly-articulated robot located outside the work volume of the machining system and configured to hold and move the optical contactless sensor;
    a mobile cart to carry the poly-articulated robot and configured to move the poly-articulated robot from outside the protected work area to the protected work area and from the protected work area to outside the protected work area;
    a computer comprising a memory, a processor and a display, the memory comprising a three-dimensional digital model of the workpiece and the computer configured to acquire coordinates of the plurality of points acquired by the optical contactless sensor; and
    a position detector located in the protected work area to measure a position of the optical contactless sensor supported by the poly-articulated robot.

2. The device of claim 1, further comprising a light barrier or a zone radar to protect access to the protected work area.

3. A method implementing the device of claim 1, comprising:
    performing the machining operation on the workpiece;
    uploading the three-dimensional digital model of the workpiece into the memory of the computer;
    moving the poly-articulated robot utilizing the mobile cart to allow the poly-articulated robot to reach the protected work area;
    acquiring the coordinates of the plurality of points on the surface of the workpiece using the measuring sensor and recording the coordinates in the memory;
    comparing positions of the plurality of points acquired to the three-dimensional digital model stored in the memory;
    wherein the workpiece is contaminated by residues;
    adjusting a reference surface from the three-dimensional digital model to the coordinates of the plurality of points acquired;
    classifying dimensional deviations in the plurality of points acquired relative to the reference surface by classes; and determining a standard deviation of a distribution of the classes relative to the reference surface;

excluding, from an analysis, points remote from the reference surface by more than one standard deviation.

4. The method of claim 3, wherein the three-dimensional model of the workpiece corresponds to a state of the workpiece at an end of the machining operation.

5. The method of claim 3, wherein the residues are chips or cutting fluid.

* * * * *